(12) United States Patent
Mogharabin et al.

(10) Patent No.: US 12,470,612 B1
(45) Date of Patent: Nov. 11, 2025

(54) SYSTEM FOR GENERATING RCS POLLS NATIVELY ON A DEVICE OPERATING SYSTEM

(71) Applicant: T-Mobile USA, Inc., Bellevue, WA (US)

(72) Inventors: Farhood Mogharabin, Everett, WA (US); Ayman A. Zaki, Renton, WA (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/657,574

(22) Filed: May 7, 2024

(51) Int. Cl.
   *H04L 65/1104* (2022.01)
   *H04L 65/1069* (2022.01)
   *H04L 65/75* (2022.01)

(52) U.S. Cl.
   CPC ...... *H04L 65/1104* (2022.05); *H04L 65/1069* (2013.01); *H04L 65/765* (2022.05)

(58) Field of Classification Search
   CPC . H04L 65/1069; H04L 65/1104; H04L 65/765
   USPC .......................................................... 709/224
   See application file for complete search history.

(56) References Cited

U.S. PATENT DOCUMENTS

| | | | |
|---|---|---|---|
| 7,280,537 B2 | 10/2007 | Roy | |
| 7,289,495 B2 | 10/2007 | Roy | |
| 7,508,810 B2 | 3/2009 | Moinzadeh et al. | |
| 7,630,714 B2 | 12/2009 | Clark et al. | |
| 7,761,522 B2 | 7/2010 | Shenfield et al. | |
| 7,805,489 B2 | 9/2010 | Roberts | |
| 7,852,795 B2 | 12/2010 | Cai | |
| 8,107,390 B2 | 1/2012 | Budampati et al. | |
| 8,193,950 B2 | 6/2012 | Ohki | |
| 8,407,298 B2 | 3/2013 | Kamat et al. | |

(Continued)

FOREIGN PATENT DOCUMENTS

| | | |
|---|---|---|
| CN | 1339900 A | 3/2002 |
| CN | 101267375 B | 12/2011 |

(Continued)

OTHER PUBLICATIONS

"RCS Universal Profile Service Definition Document", Version 2.4, GSM Association, Oct. 16, 2019, pp. 1-260.

(Continued)

*Primary Examiner* — Glenford J Madamba
(74) *Attorney, Agent, or Firm* — Perkins Coie LLP

(57) ABSTRACT

The wireless device transmits, using a message session relay protocol (MSRP), a request to a network node of a telecommunication network. The request indicates a content type of RCS poll on a telecommunication network. The request includes poll text and a poll type. The request for an RCS poll causes a display of the RCS poll via a messaging interface native to an operating system of the wireless device. The wireless device generates the request in an extensible markup language format. The poll text includes a question and at least two responses. The poll type includes a single-choice response or a multi-choice response poll. The wireless device receives, using the MSRP, from the network node, a poll response. The poll response causes a display of the poll response via the messaging interface native to the operating system of the wireless device.

20 Claims, 9 Drawing Sheets

(56) References Cited

U.S. PATENT DOCUMENTS

| | | |
|---|---|---|
| 8,441,993 B2 | 5/2013 | Son et al. |
| 9,277,522 B2 | 3/2016 | Suryavanshi |
| 10,454,802 B2 | 10/2019 | Chiang et al. |
| 10,524,106 B1 | 12/2019 | Skertich et al. |
| 11,017,183 B2 | 5/2021 | Iyer et al. |
| 11,044,584 B2 | 6/2021 | Merrett |
| 11,178,084 B2 | 11/2021 | Abdelmalek et al. |
| 11,310,289 B2 | 4/2022 | Steinbach et al. |
| 11,546,279 B1 | 1/2023 | Karimli et al. |
| 11,558,320 B2 | 1/2023 | Stafford et al. |
| 11,751,036 B2 | 9/2023 | Chockalingam |
| 2003/0100321 A1 | 5/2003 | Rao et al. |
| 2006/0133394 A1 | 6/2006 | Ware et al. |
| 2006/0235970 A1 | 10/2006 | Bateman et al. |
| 2009/0100174 A1 | 4/2009 | Annareddy et al. |
| 2011/0047227 A1 | 2/2011 | Arthurs et al. |
| 2011/0153728 A1 | 6/2011 | Einarsson et al. |
| 2012/0290707 A1 | 11/2012 | Ennis et al. |
| 2017/0078967 A1 | 3/2017 | Asterjadhi et al. |
| 2019/0356617 A1 | 11/2019 | Synal et al. |
| 2020/0275056 A1 | 8/2020 | Smith |
| 2022/0337636 A1 | 10/2022 | Han et al. |
| 2023/0188485 A1 | 6/2023 | Stafford et al. |

FOREIGN PATENT DOCUMENTS

| | | |
|---|---|---|
| CN | 102892103 B | 10/2015 |
| CN | 104135357 B | 8/2017 |
| CN | 107347201 B | 11/2021 |
| DE | 102009044757 B4 | 4/2015 |
| EP | 1715432 A1 | 10/2006 |
| EP | 2055059 B1 | 10/2012 |
| JP | 2011517825 A | 6/2011 |
| JP | 5351834 B2 | 8/2013 |
| JP | 7181717 B2 | 11/2022 |
| KR | 100298369 B1 | 8/2001 |
| KR | 20010103820 A | 11/2001 |
| KR | 100509063 B1 | 8/2005 |
| KR | 20050080947 A | 8/2005 |
| KR | 20060068884 A | 6/2006 |
| KR | 20060114960 A | 11/2006 |
| KR | 100803062 B1 | 2/2008 |
| KR | 100842644 B1 | 6/2008 |
| KR | 20080079382 A | 9/2008 |
| KR | 100862213 B1 | 10/2008 |
| KR | 20090130689 A | 12/2009 |
| KR | 20110026716 A | 3/2011 |
| KR | 101227769 B1 | 1/2013 |
| KR | 101334303 B1 | 11/2013 |
| KR | 20140124160 A | 10/2014 |
| KR | 20160023519 A | 3/2016 |
| KR | 20210020571 A | 2/2021 |
| WO | 2013177958 A1 | 12/2013 |
| WO | 2016174914 A1 | 11/2016 |
| WO | 2016175704 A1 | 11/2016 |
| WO | 2017037473 A1 | 3/2017 |
| WO | WO-2019160380 A1 * | 8/2019 ......... H04L 65/1016 |

OTHER PUBLICATIONS

"Rich Communication Suite—Advanced Communications Services and Client Specification", Version 11.0, GSM Association, Oct. 16, 2019, pp. 1-389.

* cited by examiner

SYSTEM FOR GENERATING RCS POLLS NATIVELY ON A DEVICE OPERATING SYSTEM

BACKGROUND

Rich communication services (RCS) is a communication protocol between mobile telephone carriers and between phone and carrier, aimed at enhancing SMS messages with a text-message system that supports richer content, provides phonebook polling (for service discovery), and transmits in-call multimedia. RCS is part of the Internet Protocol (IP) multimedia subsystem.

BRIEF DESCRIPTION OF THE DRAWINGS

Detailed descriptions of implementations of the present invention will be described and explained through the use of the accompanying drawings.

Figure 1:
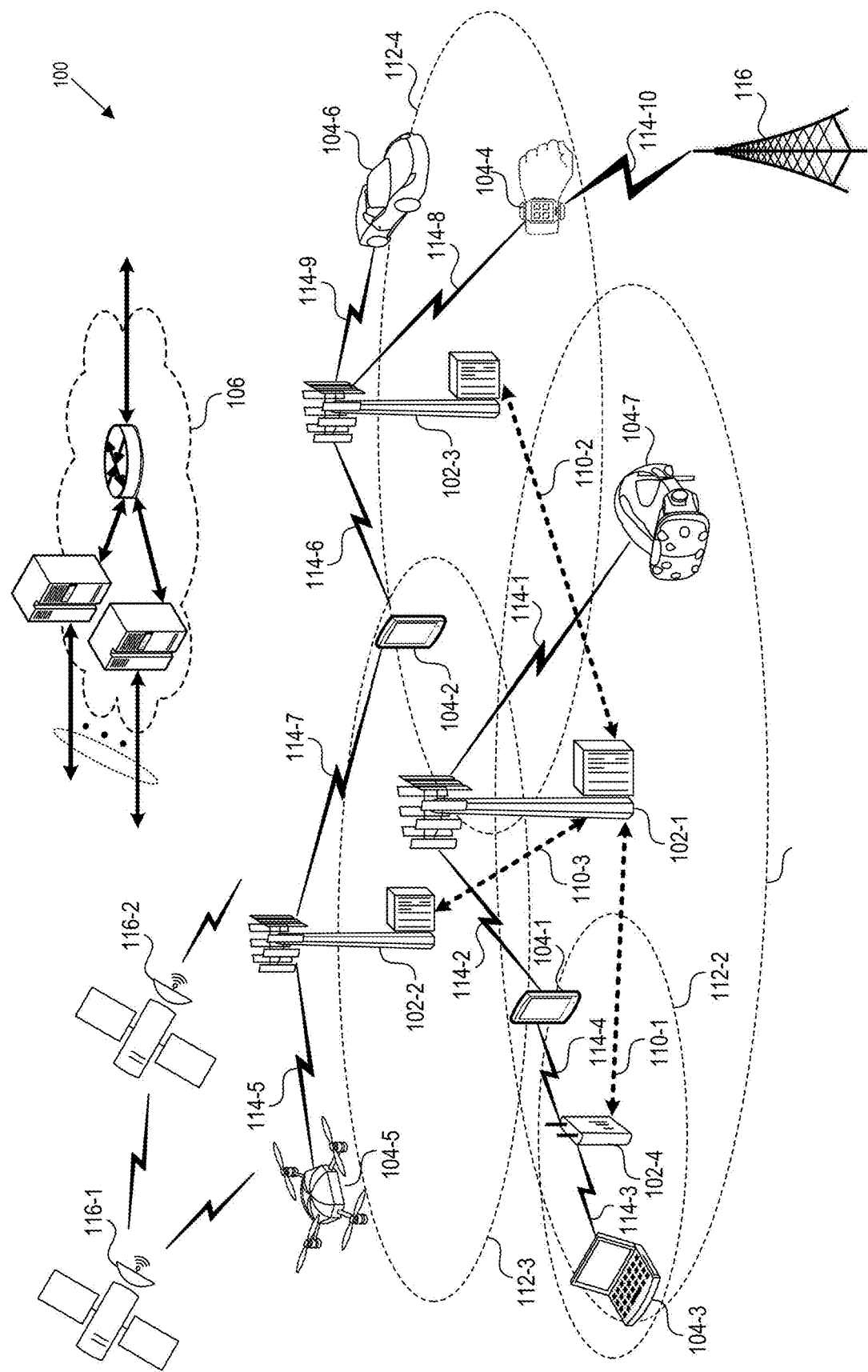
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Unlike over-the-top (OTT) messaging applications, such as WhatsApp, rich communication services (RCS) is a protocol that operates over mobile networks and relies on carrier support. While RCS aims to enhance SMS messaging by providing features such as typing indicators or multimedia sharing, the RCS protocol does not currently support a polling feature.

The disclosed technology relates to support for the polling feature for RCS. A poll is a survey designed to record the opinion of a population by asking the population one or more questions about a specific topic. The disclosed technology enables the RCS standard to generate and transmit polls between RCS-enabled wireless devices using mobile networks and carrier support, allowing for functionality similar to OTT messaging applications without the need to install such OTT messaging applications. The system can receive a request from an RCS-enabled wireless device to perform a poll over RCS on a telecommunication network. The poll request can indicate a content type of RCS poll on a telecommunication network. The poll request can include the poll type and the poll text. For example, the poll type can be a single-choice response poll, where the poll responder can only select a single response in the poll. In another example, the poll type can be a multi-choice response poll, where the poll responder can select multiple responses in the poll. For example, the poll text can include the question and at least two response choices. The request for the RCS poll can cause a display of the RCS poll via a messaging interface native to the operating system of the RCS-enabled wireless device.

The system can generate the poll based on the requested poll type and poll text. In some embodiments, the poll is generated in an extensible markup language (XML) format. The system transmits the poll using a message session relay protocol (MSRP) as an RCS message over the telecommunication network from the RCS-enabled wireless device to a network node. For example, the network node can deliver the request for an RCS poll to a secondary RCS-enabled wireless device. The system can, using the MSRP, receive a poll response from the network node. For example, the poll response can be received in the XML format. The system can cause the RCS-enabled wireless device to display the poll result to the wireless device user via the messaging interface native to the operating system of the RCS-enabled wireless device.

In some embodiments, the network node delivers the poll request to multiple secondary RCS-enabled wireless devices. The system can receive multiple poll responses. The system can generate a poll graphic. The poll graphic is a visual representation of the poll response. For example, the poll graphic can be a list or chart illustrating the number of votes for each response choice. In another example, the poll graphic can be a detailed picture showing an illustrated version of the poll responses. The system can cause the RCS-enabled wireless device to display the poll graphic via the messaging interface native to the operating system of the RCS-enabled wireless device. In one example, the system can cause all secondary RCS-enabled wireless devices that responded to the poll to display the poll graphic.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4

(also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
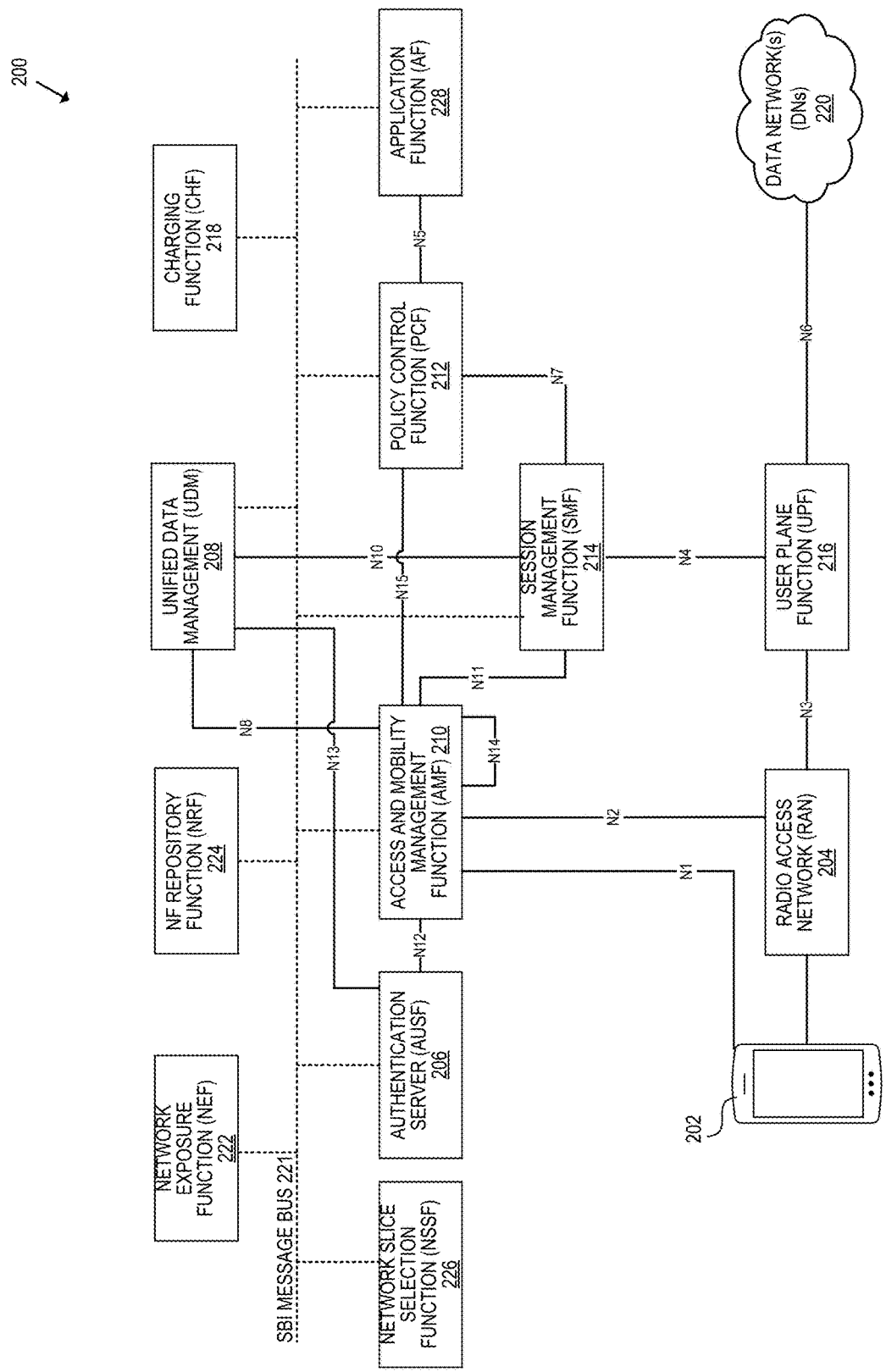
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them.

The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Message Session Relay Protocol and Session Initiation Protocol Signaling

The message session relay protocol (MSRP) is a protocol for transmitting a series of related instant messages in the context of a communications session. An application initiates the session with the Session Description Protocol (SDP) over Session Initiation Protocol (SIP).

SIP is a signaling protocol used for initiating, maintaining, modifying, and terminating real-time communications sessions between IP devices. SIP enables voice, messaging, video, and other communications applications and services to be used between two or more endpoints on IP networks. SIP operates similarly to and incorporates parts of Hypertext Transfer Protocol (HTTP) and Simple Mail Transfer Protocol (SMTP). Like HTTP or SMTP, SIP works in the application layer of the Open Systems Interconnection communications model. It is supported by IPv4 and IPv6.

SIP can be thought of as a client/server architecture. SIP works in tandem with the SDP, which is contained in SIP messages. The SDP is used to describe multimedia communication to sessions for invitations, announcements, and parameter negotiations. SIP is a request-response protocol. Requests and responses are the names of message protocols sent between devices to communicate. SIP receives requests from clients and responses from servers. Requests can be sent through any transport protocol, such as User Datagram Protocol, Stream Control Transmission Protocol, or Transmission Control Protocol.

Devices using SIP communicate with each other directly via a SIP proxy server. The proxy acts as an intermediary system to offload tasks that would otherwise be handled by SIP. SIP determines the endpoint used for a session, the communication media, media parameters, and whether the called party agrees to communicate. Then, SIP establishes call parameters at either end of the communication and handles call transfer and termination.

The MSRP requires a reliable transport layer, such as Transmission Control Protocol (TCP). Each message is either a request or a response and uses uniform resource identifiers (URIs). A message contains headers and a body that can carry any type of data, including binary information. Table 1 shows an example MSRP message in a SIP session.

TABLE 1

INVITE sip:bob@biloxi.example.com SIP/2.0
To: <sip:bob@biloxi.example.com>
From: <sip:alice@atlanta.example.com>;tag=786
Call-ID: 3413an89KU
Content-Type: application/sdp
c=IN IP4 atlanta.example.com
m=message 7654 TCP/MSRP *
a=accept-types:text/plain
a=path:msrp://atlanta.example.com:7654/jshA7weztas;tcp The MSRP session starts with a SIP INVITE and ends with a SIP BYE message. As a back-to-back user agent (B2BUA), the device interoperates between the MSRP endpoints, terminating the incoming MSRP message on the inbound leg and generating a new MSRP message on the outbound leg. Before sending the INVITE, the device manipulates the SDP body (e.g., 'a=path', 'c=', 'm=', 'a=setup', and 'a=fingerprint' lines). When the device receives an INVITE message with the MSRP offer, it initiates an SDP offer to the destination endpoint on the outgoing leg. When the device receives the MSRP answer from the destination endpoint, it sends an SDP answer to the dialog-initiating endpoint.

Figure 3:
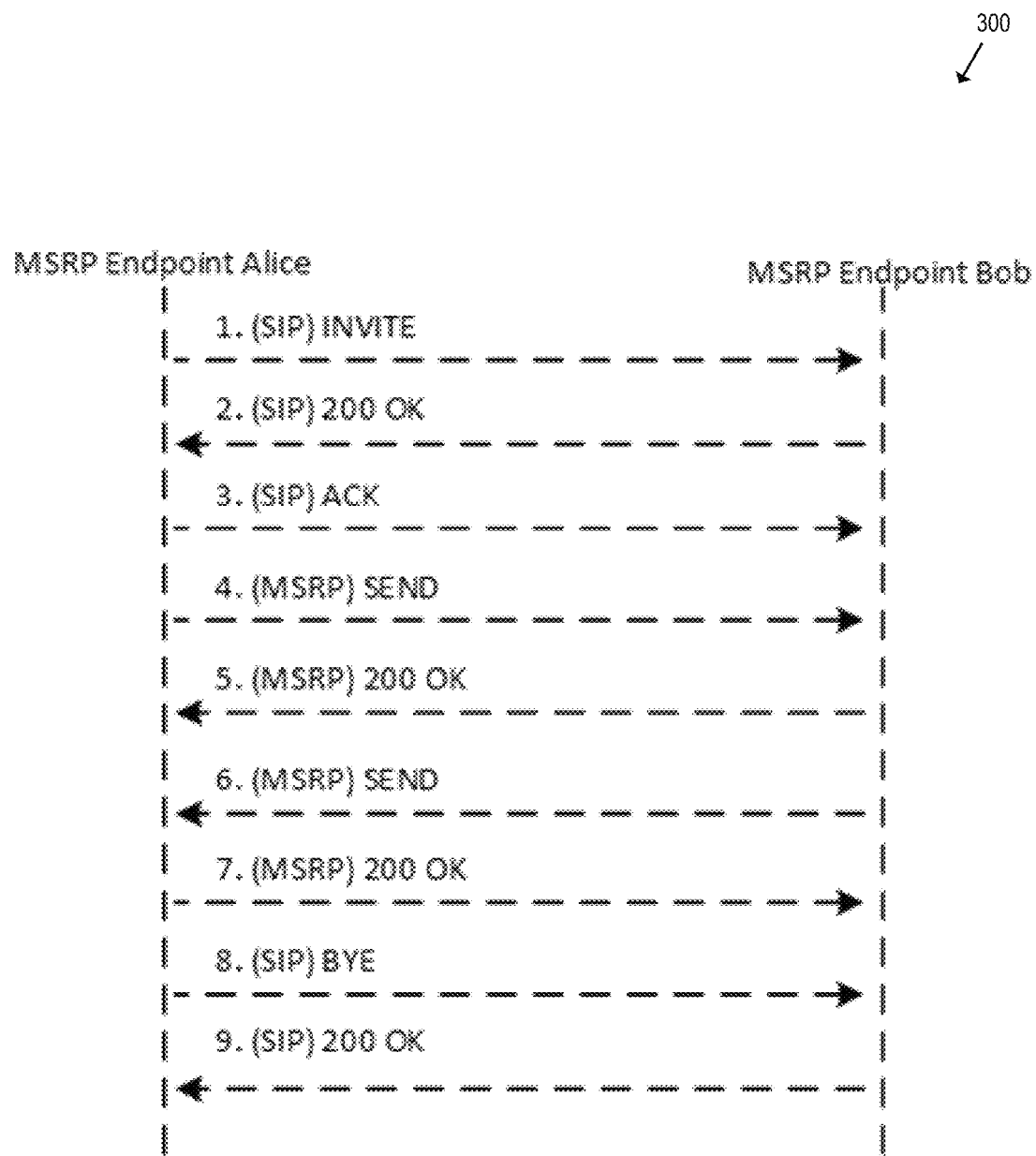
FIG. 3 illustrates an example of a basic message session relay protocol (MSRP) flow.

FIG. 3 illustrates an example of a basic MSRP flow 300. For example, the basic MSRP flow can be between two devices labeled MSRP Endpoint Alice (Alice) and MSRP Endpoint Bob (Bob). At step 1, Alice can transmit a (SIP) INVITE with an accompanying SDP to Bob. At step 2, Bob accepts the SDP offer, generates a local session ID (contained in his MSRP URI specified by the path attribute), and issues a 200 OK response to Alice. At step 3, Alice can transmit a (SIP) ACK to Bob to confirm the invite request and establish a SIP session.

At step 4, Alice initiates an MSRP session with an (MSRP) SEND request to Bob. All MSRP requests begin with the MSRP start line, which contains three elements. The first element is the protocol-id, which is the MSRP. The second element is the transaction-id, which is an ephemeral transaction identifier used to correlate MSRP requests and responses and to frame the contents of the MSRP message. The third element is the method, which is SEND (MSRP method that supports data transfer). The MSRP start line is followed by the To-Path and From-Path headers containing destination and source addresses—the MSRP URIs exchanged during the MSRP negotiation. The Message-ID header contains a random string generated by the message originator. This ephemeral value, whose lifetime is measured from message start to message end, correlates MSRP status reports with a specific message and re-assembles MSRP message fragments. The Byte-Range header contains the message length, in bytes, and the specific byte range carried by this message. Contents of this header are generally of interest only if the message has been fragmented. The Content-Type header describes the message type and must conform to the results of the MSRP negotiation. The actual message follows the Content-Type header. Finally, the SEND request is closed with an end-line of seven hyphens, the transaction-id, and a $ to indicate that this request contains the end of a complete message, or + to indicate that this request does not contain the message end.

At step 5, Bob acknowledges receipt with an (MSRP) 200 OK response to Alice. At step 6, Bob can send an (MSRP) SEND request to Alice. At step 7, Alice can acknowledge receipt with an (MSRP) 200 OK response to Bob. At step 8, Alice can send a (SIP) BYE request to Bob to terminate the SIP session and the MSRP session. Alice can, of course, send more SEND requests to Bob before sending the BYE. At step 7, Bob sends a (SIP) 200 OK response to Alice, at which point the SIP session and the MSRP session are terminated.

RCS Poll Feature

The SIP communicates using the extensible markup language (XML) format. XML is a markup language that provides rules to define any data. Unlike other programming languages, XML cannot perform computing operations by itself. The device can receive instructions in the XML format, which it can read and perform. Additionally, a message sent between two devices can be in the XML format. For example, the XML format can contain invite information such as who the message is from and to whom it is being transmitted. The XML can also contain the content-type and the text of the message being transmitted. The content-type can indicate the media type of the message.

To introduce the support for the poll feature, a new content type can be defined in the XML format. Table 2 shows an example embodiment of an MSRP request message having a content type of a poll. In this specific example, the content type is defined as "application/poll+xml," but alternative/additional names can be used to indicate that the request is associated with a user poll. The body of the poll request can be marked using "<pollRequest> . . . </pollRequest>," with additional fields defined within. Table 2 shows an example of a single-choice poll that allows users to provide a single choice as a response. For example, the body of the poll request can include a field "<questionType>" to indicate the type of poll being single choice or not. Other field names, such as pollType or choiceType, can also be used to indicate the type of the poll (e.g., single choice or multiple choice).

TABLE 2

MSRP /example-session-1/message-1
To-Path: msrp://example.com/session-id-1
From-Path: msrp://example.org/session-id-2
Content-Type: application/poll+xml
<?xml version="1.0" encoding="UTF-8"?>
<pollRequest>
   <contentType>poll</contentType>
   <questionType>singleChoice</question Type>
   <questionText>What is your favorite color?</question Text>
   <options>
     <option number="1">Red</option>
     <option number="2">Blue</option>
     <option number="3">Green</option>
     <option number="4">Yellow</option>
   </options>
</pollRequest>

Table 3 illustrates an example MSRP response message corresponding to the request message shown in Table 2. The response message shown in Table 3 also has a content type of a poll (e.g., "application/poll+xml"). The body of the poll request can be marked using "<pollAnswer> . . . </pollAnswer>," with additional fields defined within. Table 3 shows an example of a single-choice answer corresponding to a single-choice poll. For example, the body of the poll request can include a field "<choiceType>" to indicate the type of poll being single choice or not. Other field names, such as questionType or choiceType, can also be used to indicate the type of the poll (e.g., single choice or multiple choice).

TABLE 3

MSRP /example-session-1/message-2
To-Path: msrp://example.org/session-id-2

TABLE 3-continued

From-Path: msrp://example.com/session-id-1
Content-Type: application/poll+xml
<?xml version="1.0" encoding="UTF-8"?>
<pollAnswer>
   <contentType>poll</contentType>
   <choiceType>singleChoice</choiceType>
   <selectedOption number="2">Blue</selectedOption>
</pollAnswer>

Figure 4A:
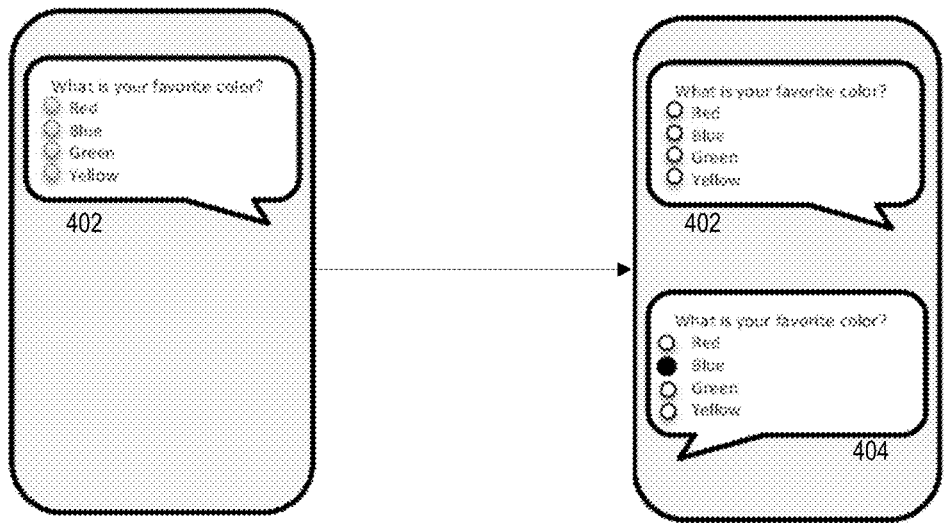
FIG. 4A illustrates an example user interface showing a single-choice poll request and poll answer in accordance with one or more embodiments of the present technology.

FIG. 4A illustrates an example user interface showing a single-choice poll request and poll answer in accordance with one or more embodiments of the present technology. Upon receiving the poll request (e.g., via an SIP proxy), the user device can render or display the poll question in the native messaging interface. When the poll type is a single-choice response poll, the poll responder can only select a single response in the poll. As shown in FIG. 4A, the rendering or the display of the poll question corresponds to the poll request and answer shown in the XML-format messages in Table 2 and Table 3.

An RCS-enabled wireless device can generate a single-choice response poll 402 as a message via the messaging interface native to an operating system of the RCS-enabled wireless device. The poll text can indicate that the poll question is "What is your favorite color?" and that the poll response choices are Red, Blue, Green, or Yellow. The poll 402 can be transmitted over the telecommunication network to a secondary RCS-enabled wireless device. A poll response 404 is generated at the secondary RCS-enabled wireless device and transmitted to the RCS-enabled wireless device. The poll type and the corresponding XML for the poll restrict the secondary RCS-enabled wireless device from selecting more than one response choice. The RCS-enabled wireless device can display the poll response 404 via the messaging interface native to an operating system of the RCS-enabled wireless device. The poll response 404 can indicate that the secondary RCS-enabled wireless device chose "Blue" as the response.

In another example, the poll type can be a multi-choice response poll, where the poll responder can select multiple responses in the poll. For example, the poll text can include the question and at least two response choices. The request for the RCS poll can cause a display of the RCS poll via a messaging interface native to the operating system of the RCS-enabled wireless device.

Table 4 shows another example embodiment of an MSRP request message having a content type of a poll. The content type is defined as "application/poll+xml," but alternative/additional names can be used to indicate that the request is associated with a user poll. The body of the poll request can be marked using "<pollRequest> . . . </pollRequest>," with additional fields defined within. Table 4 shows an example of a multi-choice poll that allows users to provide multiple choices as a response. For example, the body of the poll request can include a field "<questionType>" to indicate the type of poll being multi-choice or not.

TABLE 4

MSRP /example-session-1/message-1
To-Path: msrp://example.com/session-id-1
From-Path: msrp://example.org/session-id-2
Content-Type: application/poll+xml
<?xml version="1.0" encoding="UTF-8"?>
<pollRequest>
   <contentType>poll</contentType>
   <questionType>multipleChoice</questionType>

TABLE 4-continued

```
    <questionText>Which fruits do you like?</questionText>
    <options>
        <option number="1">Apple</option>
        <option number="2">Banana</option>
        <option number="3">Orange</option>
        <option number="4">Grapes</option>
    </options>
</pollRequest>
```

Table 5 illustrates an example MSRP response message corresponding to the request message shown in Table 4. The response message shown in Table 5 also has a content type of a poll (e.g., "application/poll+xml"). The body of the poll request can be marked using "<pollAnswer> . . . </pollAnswer>," with additional fields defined within. Table 5 shows an example of a multi-choice response corresponding to a multi-choice poll. For example, the body of the poll request can include a field "<choiceType>" to indicate the type of poll being multi-choice or not. Other field names, such as questionType or choiceType, can also be used to indicate the type of the poll (e.g., single choice or multiple choice).

TABLE 5

```
MSRP /example-session-1/message-2
To-Path: msrp://example.org/session-id-2
From-Path: msrp://example.com/session-id-1
Content-Type: application/poll+xml
<?xml version="1.0" encoding="UTF-8"?>
<pollAnswer>
    <contentType>poll</contentType>
    <choice Type>multipleChoice</choiceType>
    <containsSelectedOption>true</containsSelectedOption>
    <selectedOptions>
        <option number="1">Apple</option>
        <option number="3">Orange</option>
    </selectedOptions>
</pollAnswer>
```

Figure 4B:
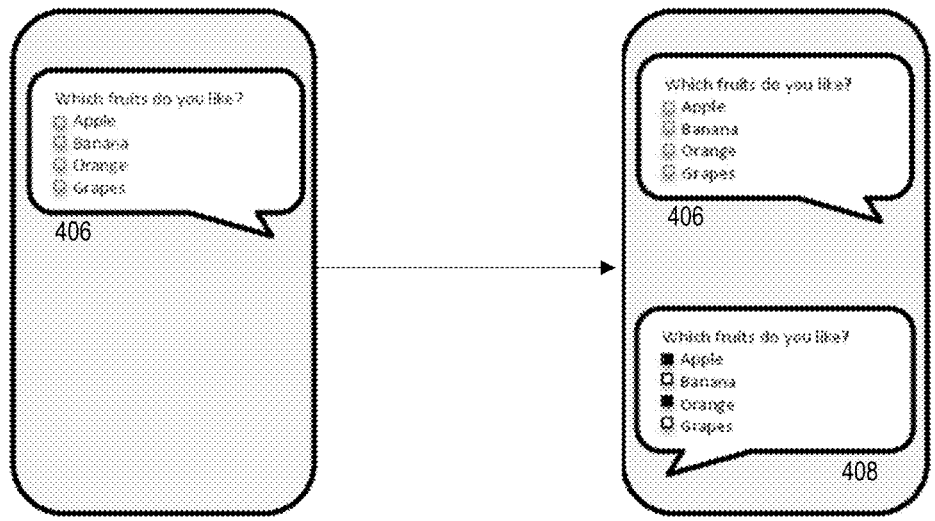
FIG. 4B illustrates an example user interface showing a multi-choice poll request and poll answer in accordance with one or more embodiments of the present technology.

FIG. 4B illustrates an example user interface showing a multi-choice poll request and poll answer in accordance with one or more embodiments of the present technology. Upon receiving the poll request (e.g., via an SIP proxy), the user device can render or display the poll question in the native messaging interface. When the poll type is a multi-choice response poll, the poll responder can select multiple responses in the poll. As shown in FIG. 4B, the rendering or the display of the poll question corresponds to the poll request and answer shown in the XML-format messages in Table 4 and Table 5.

An RCS-enabled wireless device can generate a multi-choice response poll 406 as a message via the messaging interface native to an operating system of the RCS-enabled wireless device. The poll text can indicate that the poll question is "Which fruits do you like?" and that the poll response choices are Apple, Banana, Orange, and Grapes. The poll 406 can be transmitted over the telecommunication network to a secondary RCS-enabled wireless device. A poll response 408 is generated at the secondary RCS-enabled wireless device and transmitted to the RCS-enabled wireless device. The poll type and the corresponding XML for the poll allow the secondary RCS-enabled wireless device to select more than one response choice. The RCS-enabled wireless device can display the poll response 408 via the messaging interface native to an operating system of the RCS-enabled wireless device. The poll response 408 can indicate that the secondary RCS-enabled wireless device chose "Apple" and "Orange" as the response.

In some embodiments, the single-choice or multi-choice poll can be encrypted. The poll can be encrypted by the RCS-enabled wireless device, by a network node, or by a secondary network node. The request for the RCS poll can be encrypted. For example, the XML for the poll can be encrypted to prevent unknown entities from accessing the content of the poll text. When the poll is encrypted by the RCS-enabled device, the encrypted poll request can be transmitted to the network node. An encrypted poll response is received from the network node, where the encrypted poll response is decrypted. When the poll request is encrypted by the network node, the network node also decrypts the poll response. When the poll response is encrypted by a secondary network node, the secondary network node also decrypts the poll response.

Figure 5:
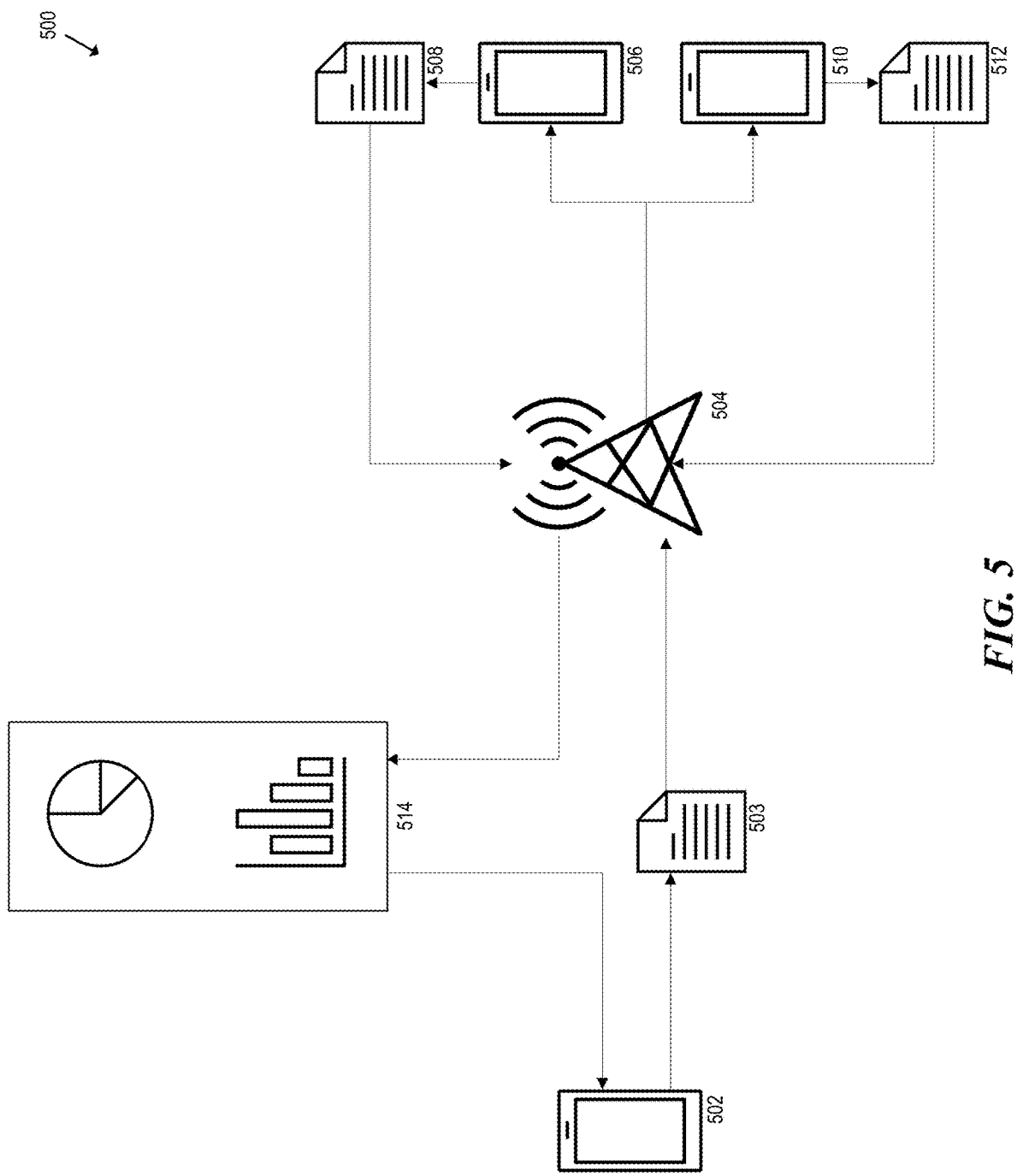
FIG. 5 is a block diagram that illustrates an embodiment for the system.

FIG. 5 is a block diagram that illustrates an embodiment 500 for the system. RCS-enabled wireless device 502 can transmit, using the MSRP, request 503 to network node 504 of a telecommunication network. Request 503 can indicate the content type of the RCS poll on the telecommunication network. Additionally, request 503 can include the poll type and poll text. Request 503 can be transmitted in the XML format and can indicate that the request should be sent to second RCS-enabled wireless device 506 and third RCS-enabled wireless device 510. Second RCS-enabled wireless device 506 can generate poll response 508. Third RCS-enabled wireless device 510 can generate poll response 512. The poll responses can be generated in the XML format.

Poll response 508 and poll response 512 can be transmitted to network node 504. Network node 504 transmits the poll responses to RCS-enabled wireless device 502. RCS-enabled wireless device 502 receives the poll responses using the MSRP. The poll responses can be visualized as graph 514. Graph 514 is a visual representation of the responses included in the poll responses. For example, graph 514 can be a bar graph, a pie chart, a line graph, a scatter plot, a histogram, or a pictograph. RCS-enabled wireless device 502 can display graph 514 via the messaging interface native to RCS-enabled wireless device 502.

In some embodiments, the system is located on RCS-enabled wireless device 502. Using the MSRP, RCS-enabled wireless device 502 can transmit request 503 for an RCS poll to network node 504. Using the MSRP, RCS-enabled wireless device 502 can receive the poll responses from network node 504. In some embodiments, the system is located on network node 504. The system receives, using the MSRP, request 503 from RCS-enabled wireless device 502 to perform an RCS poll. The system transmits the poll responses to the RCS-enabled wireless device 502.

Machine Learning Model

Figure 6:
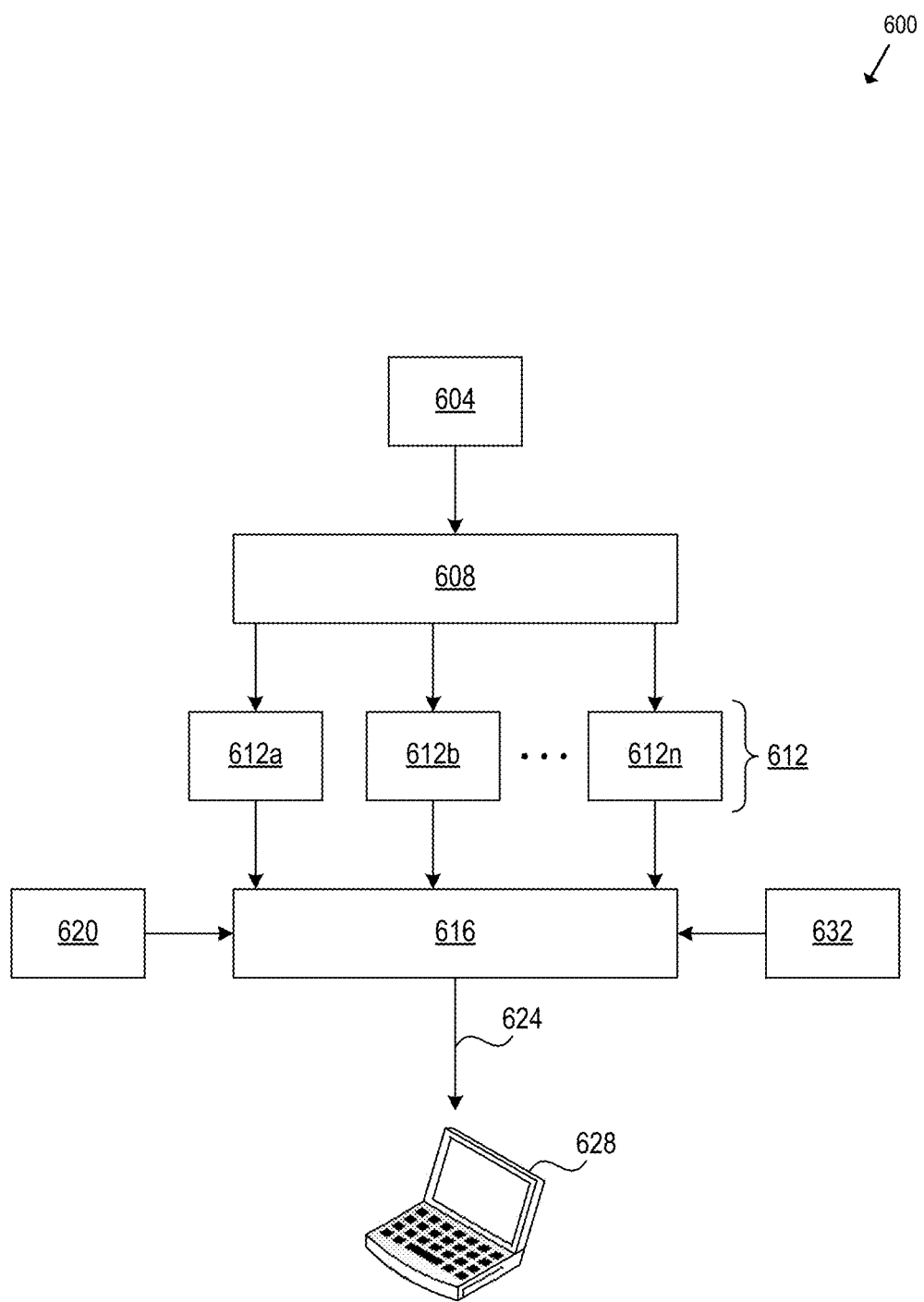
FIG. 6 is a block diagram illustrating an example machine learning (ML) system, in accordance with one or more embodiments.

FIG. 6 is a block diagram illustrating an example ML system 600, in accordance with one or more embodiments. Likewise, different embodiments of the ML system 600 include different and/or additional components and are connected in different ways. The ML system 600 is sometimes referred to as an ML module.

The ML system 600 includes a feature extraction module 608 implemented using components of the example computer system 900 illustrated and described in more detail with reference to FIG. 9. In some embodiments, the feature extraction module 608 extracts a feature vector 612 from input data 604. The feature vector 612 includes features 612a, 612b, . . . , 612n. The feature extraction module 608 reduces the redundancy in the input data 604, for example, repetitive data values, to transform the input data 604 into the reduced set of features 612, for example, features 612a, 612b, . . . , 612n. The feature vector 612 contains the relevant information from the input data 604, such that events or data value thresholds of interest are identified by the ML model 616 by using a reduced representation. In some example embodiments, the following dimensionality reduction techniques are used by the feature extraction module 608: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 616 performs deep learning (also known as deep structured learning or hierarchical learning) directly on the input data 604 to learn data representations, as opposed to using task-specific algorithms. In deep learning, no explicit feature extraction is performed; the features 612 are implicitly extracted by the ML system 600. For example, the ML model 616 uses a cascade of multiple layers of nonlinear processing units for implicit feature extraction and transformation. Each successive layer uses the output from the previous layer as input. The ML model 616 thus learns in supervised (e.g., classification) and/or unsupervised (e.g., pattern analysis) modes. The ML model 616 learns multiple levels of representations that correspond to different levels of abstraction, wherein the different levels form a hierarchy of concepts. The multiple levels of representation configure the ML model 616 to differentiate features of interest from background features.

In alternative example embodiments, the ML model 616, for example, in the form of a convolutional neural network (CNN), generates the output 624, without the need for feature extraction, directly from the input data 604. The output 624 is provided to the computer device 628. The computer device 628 is a server, computer, tablet, smartphone, smart speaker, etc., implemented using components of the example computer system 900 illustrated and described in more detail with reference to FIG. 9. In some embodiments, the steps performed by the ML system 600 are stored in memory on the computer device 628 for execution. In other embodiments, the output 624 is displayed on an electronic display of the computer device 628.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field is approximated mathematically by a convolution operation. CNNs are based on biological processes and are variations of multilayer perceptrons designed to use minimal amounts of preprocessing.

In embodiments, the ML model 616 is a CNN that includes both convolutional layers and max pooling layers. For example, the architecture of the ML model 616 is "fully convolutional," which means that variable-sized sensor data vectors are fed into it. For convolutional layers, the ML model 616 specifies a kernel size, a stride of the convolution, and an amount of zero padding applied to the input of that layer. For the pooling layers, the ML model 616 specifies the kernel size and stride of the pooling.

In some embodiments, the ML system 600 trains the ML model 616, based on the training data 620, to correlate the feature vector 612 to expected outputs in the training data 620. As part of the training of the ML model 616, the ML system 600 forms a training set of features and training labels by identifying a positive training set of features that have been determined to have a desired property in question, and, in some embodiments, forms a negative training set of features that lack the property in question.

The ML system 600 applies ML techniques to train the ML model 616, that when applied to the feature vector 612, outputs indications of whether the feature vector 612 has an associated desired property or properties, such as a probability that the feature vector 612 has a particular Boolean property, or an estimated value of a scalar property. In embodiments, the ML system 600 further applies dimensionality reduction (e.g., via linear discriminant analysis (LDA), PCA, or the like) to reduce the amount of data in the feature vector 612 to a smaller, more representative set of data.

In embodiments, the ML system 600 uses supervised ML to train the ML model 616, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 632 is formed of additional features, other than those in the training data 620, which have already been determined to have or to lack the property in question. The ML system 600 applies the trained ML model 616 to the features of the validation set 632 to quantify the accuracy of the ML model 616. Common metrics applied in accuracy measurement include Precision and Recall, where Precision refers to a number of results the ML model 616 correctly predicted out of the total it predicted, and Recall is a number of results the ML model 616 correctly predicted out of the total number of features that had the desired property in question. In some embodiments, the ML system 600 iteratively re-trains the ML model 616 until the occurrence of a stopping condition, such as the accuracy measurement indication that the ML model 616 is sufficiently accurate, or a number of training rounds having taken place. In embodiments, the validation set 632 includes data corresponding to confirmed locations, dates, times, activities, or combinations thereof. This allows the detected values to be validated using the validation set 632. The validation set 632 is generated based on the analysis to be performed.

Figure 7:
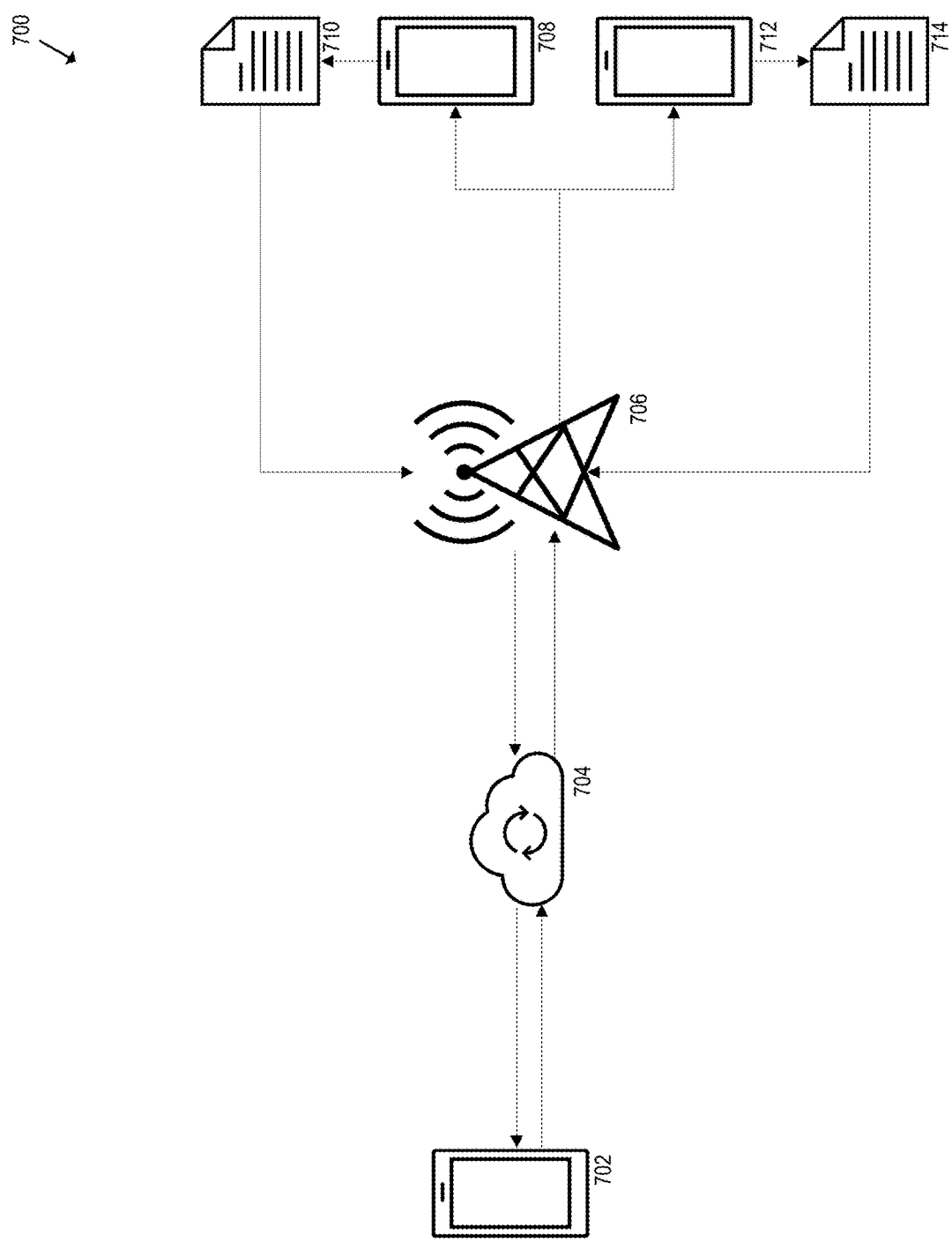
FIG. 7 is a block diagram that illustrates an embodiment for the system.

FIG. 7 is a block diagram that illustrates an embodiment 700 for the system. A neural network model (model) 704 can generate RCS poll requests. For example, model 704 can be a large language model (LLM) or another artificial intelligence (AI) model capable of analyzing text and generating polls. For example, model 704 can be located on RCS-enabled wireless device 702, network node 706 of the telecommunication network, or a secondary network node of the telecommunication network (not shown). The request is transmitted using the MSRP. The request can indicate the content type of RCS poll on the telecommunication network. Additionally, the request can include the poll type and poll text.

The request can be transmitted in the XML format and can indicate that the request should be sent to second RCS-enabled wireless device 708 and third RCS-enabled wireless device 712. Second RCS-enabled wireless device 708 can generate poll response 710. Third RCS-enabled wireless device 712 can generate poll response 714. The poll responses can be generated in the XML format. Poll response 710 and poll response 714 can be transmitted to network node 706. Network node 706 transmits the poll responses to RCS-enabled wireless device 702. RCS-enabled wireless device 702 receives poll responses using the MSRP. RCS-enabled wireless device 702 can display the poll responses via the messaging interface native to RCS-enabled wireless device 702.

In some embodiments, the poll type is an RCS poll bot assistant or "poll buddy." The poll bot assistant can be an integrated chatbot designed for creating, managing, and analyzing polls that can be located within the messaging interface native to the operating system of RCS-enabled wireless device 702 and can be embedded in an RCS message thread. For example, the system can use the poll bot assistant to facilitate dynamic polling and offer poll suggestions based on the chat content. In another example, the poll bot assistant can create reoccurring polls, tally live poll results, and display the results in different visual formats such as charts or graphs. The charts can be pie charts, line graphs, scatter plots, bar graphs, or any other type of chart or graph used to display data. The poll bot assistant can use model 704 to analyze the chat content and generate the visual format of the poll results. For example, model 704 can allow the poll bot assistant to perform natural language processing to understand informal poll requests in the chat content and convert the informal poll request to a structured poll. For example, an informal poll request in the chat content can ask, "Hey, quick check, who's up for sushi tonight?" The system can use the poll bot assistant to automatically convert the informal poll request to a structured poll that is transmitted to the chat as an RCS message.

In some embodiments, the poll type is a "mood odometer," which includes a sentiment-based poll creation tool. The system can use model 704 to analyze a conversation or chat between at least two RCS-enabled wireless devices to assess the tone or sentiment of the conversation. For example, the system can calculate a sentiment value based on the assessed tone of the conversation. Model 704 can suggest or generate a poll based on the sentiment value that matches the tone of the chat. For example, when the chat includes a debate about a movie, television show, or book, the system can generate a poll to rate the movie, television show, or book.

In some embodiments, the poll type can be a story poll. A story poll type allows users to post a story, such as a short video or image, to the conversation, where the story disappears after a predetermined amount of time. For example, the predetermined amount of time can be one hour, six hours, twelve hours, one day, or one week. The system can embed a poll into the story, which, for example, can allow users to vote on the content of the story or make decisions about some action. The poll can be generated by a user or by model 704. For example, a story can include a poll asking, "Which project should we tackle in our meeting?" The poll can disappear when the meeting is scheduled to begin. The story poll can boost engagement in the poll by being visually appealing and being time-limited.

In some embodiments, the poll type can be a "choose your own adventure" type poll. The poll can incorporate group decision-making. For example, the system can generate a series of polls using model 704 to create an adventure game where the system displays a series of dynamic polls in the chat. The selected poll response can determine which poll is presented next to the conversation. Therefore, different outcomes can occur depending on which poll responses are selected. The "choose your own adventure" poll type can be used, for example, when planning a group outing between friends or for making important business decisions, such as project direction choices. For example, the "choose your own adventure" poll type can make the consensus-building process more engaging by gamifying the user experience. In one example, the request can include physical locations for the poll to create a treasure hunt-type game or a race to reach a specific destination or goal.

In some embodiments, the poll type can be a real-time dashboard. The system can generate a real-time dashboard with animated graphs, charts, or emotion icons (emojis) illustrating the poll responses using model 704. For example, the dashboard can illustrate the emotion or tone of the poll responses. The dashboard can also illustrate a visualization of the opinion shifts in the poll responses. Illustrating the poll responses in this manner can make the polling process more dynamic and engaging compared to the often static polling process. In one example, model 704 can be used to interpret the changes in poll responses to provide insights or predictions about the poll responders' decisions or preferences.

Figure 8:
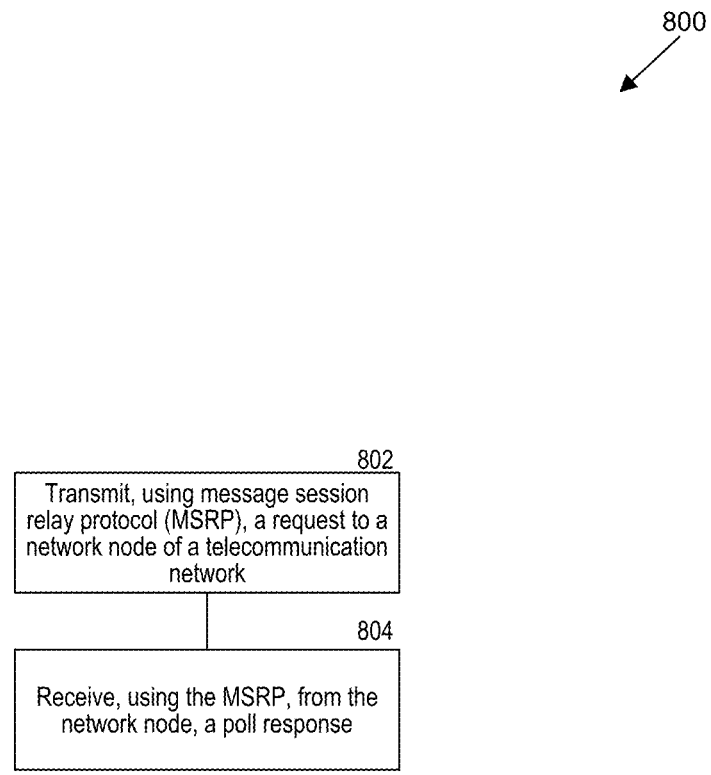
FIG. 8 is a flowchart of a process performed by a device for performing RCS polls on a telecommunication network.

FIG. 8 is a flowchart of a process 800 performed by a wireless device for performing RCS polls on a telecommunication network. In one example, the wireless device can be embodied in a system, including at least one hardware processor and at least one non-transitory memory storing instructions, which, when executed by the at least one hardware processor, cause the wireless device to perform the process 800.

At step 802, the wireless device can transmit, using a message session relay protocol (MSRP), a request to a network node of a telecommunication network. The request can indicate a content type of RCS poll on a telecommunication network and can include a poll type and poll text. The request for an RCS poll can cause a display of the RCS poll via a messaging interface native to an operating system of the wireless device. In one example, the wireless device can receive, at the network node of a telecommunication network, using the MSRP, a request from an RCS-enabled device.

In one example, the wireless device can generate the request in an extensible markup language (XML) format. The poll text includes a question and at least two responses and the poll type includes a single-choice response or a multi-choice response poll.

In another example, the wireless device can receive multiple poll responses from multiple secondary RCS-enabled wireless devices via the network node. The wireless device can generate a poll graphic that is a visual representation of the multiple poll responses. The wireless device can cause the display of the poll graphic via the messaging interface native to the operating system of the wireless device. In another example, the wireless device can encrypt the request for the RCS poll. The wireless device can transmit the encrypted request for the RCS poll to the network node. The wireless device can receive from the network node an encrypted poll response. The wireless device can decrypt the encrypted poll response.

In another example, the wireless device includes a neural network model (model) located locally on the RCS-enabled wireless device that is configured to generate candidate poll requests based on a messaging history of the RCS-enabled wireless device. In another example, the wireless device includes a neural network model located on the network node that is configured to generate candidate poll requests based on a messaging history of the RCS-enabled wireless device.

In one example, the wireless device can analyze, using the model, at least one RCS message transmitted between the RCS-enabled wireless device and the network node. The wireless device can generate, using the model, a recommendation for the request for the RCS poll based on the analysis of the at least one RCS message. In another example, the wireless device can analyze, using the model, multiple RCS messages transmitted between the RCS-enabled wireless device and the network node. The wireless device can calculate a sentiment value based on the analysis of the multiple RCS messages. The wireless device can generate, using the model, the request for the RCS poll when the sentiment value exceeds a threshold value. The model can be configured to generate the poll text based on the analysis of the multiple RCS messages.

In another example, the wireless device can generate, using the model, a first request for an RCS poll. The model can be configured to generate the poll text for the first request based on an input received to the wireless device. The wireless device can generate, using the model, multiple secondary requests for RCS polls in response to the first request, where each of the multiple secondary requests for RCS polls includes unique poll text. The model can be configured to generate the poll text of the multiple secondary requests for RCS polls based on the poll text of the first request for an RCS poll. In another example, the wireless device can generate, via the messaging interface native to the operating system of the wireless device, a real-time graphic based on multiple poll responses received from the network node. The wireless device can analyze, using the model, the multiple poll responses. The wireless device can generate, using the model, an insight about at least one RCS poll responder. The model can be configured to generate the insight based on the analysis of the multiple poll responses. The at least one RCS poll responder can provide at least one poll response and the insight can include a predicted decision of the at least one RCS poll responder or a preference of the at least one RCS poll responder. The wireless device can update the real-time graphic based on the insight. The wireless device can cause the display of the updated real-time graphic via the messaging interface native to the operating system of the multiple RCS-enabled wireless devices.

In another example, the wireless device can receive a post on the messaging interface native to the operating system of the wireless device, where the post comprises a video or an image. The wireless device can embed the request for the RCS poll into the post. The wireless device can transmit the embedded request for the RCS poll to the network node. The wireless device can cause the RCS-enabled wireless device to display an embedded RCS poll on the story post for a predetermined time period.

In another example, the wireless device includes a neural network model (model) located on a secondary network node of the telecommunication network that is configured to generate candidate poll requests based on a messaging history of the RCS-enabled wireless device. In one example, the wireless device can cause the secondary network node to analyze, using the model, multiple RCS messages transmitted between the RCS-enabled wireless device and the network node. The model can calculate a sentiment value based on the analysis of the multiple RCS messages. The model can generate the request for the RCS poll when the sentiment value exceeds a threshold value. In another example, the wireless device can generate, via the messaging interface native to the operating system of the wireless device, a real-time graphic based on multiple poll responses received from the network node. The wireless device can cause the secondary network node to analyze, using the model, the multiple poll responses. The wireless device can cause the secondary network node to generate, using the model, an insight about at least one RCS poll responder. The model can be configured to generate the insight based on the analysis of the multiple poll responses. At least one RCS poll responder can provide at least one poll response. The insight can include a predicted decision of the at least one RCS poll responder or a preference of the at least one RCS poll responder. The wireless device can update the real-time graphic based on the insight received from the secondary network node. The updated real-time graphic can cause the wireless device to display the updated real-time graphic via the messaging interface native to the operating system of the multiple RCS-enabled wireless devices.

At step 804, the wireless device can receive, using the MSRP, from the network node, a poll response. The poll response can cause a display of the poll response via the messaging interface native to the operating system of the wireless device. In one example, the wireless device can transmit, from a network node of a telecommunication network, using the MSRP, a poll response to the RCS-enabled wireless device.

Computer System

Figure 9:
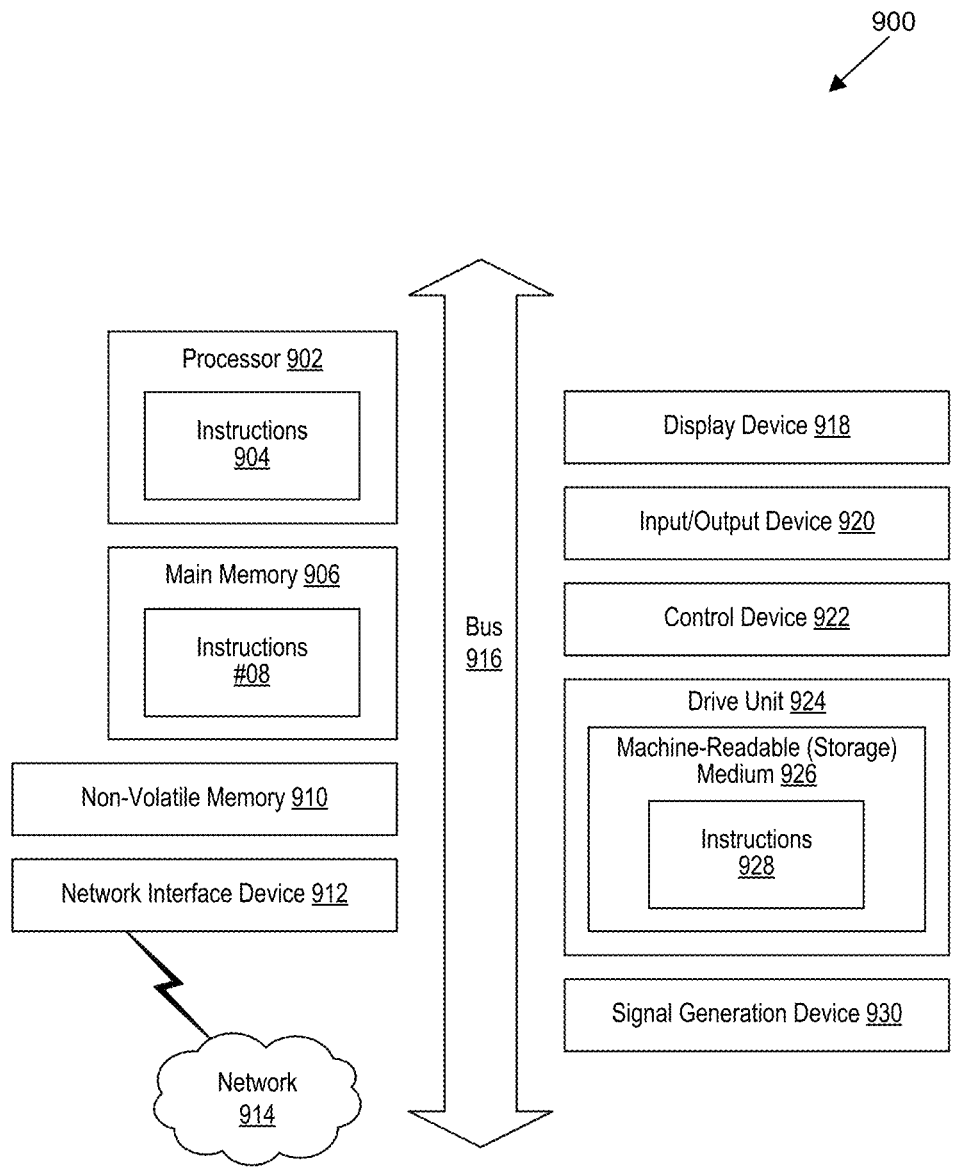
FIG. 9 is a block diagram that illustrates components of a computing device.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, a video display device 918, an input/output device 920, a control device 922 (e.g., keyboard and pointing device), a drive unit 924 that includes a machine-readable (storage) medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementations, the computer system 900 can be an embedded computer system, a system-on-chip (SOC), a single-board computer system (SBC), or a distributed system such as a mesh of computer systems, or it can include one or more cloud components in one or more networks. Where appropriate, one or more computer systems 900 can perform operations in real time, in near real time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A wireless device that supports rich communication services (RCS), comprising:
   at least one hardware processor; and
   at least one non-transitory memory storing instructions, which, when executed by the at least one hardware processor, cause the at least one hardware processor to:
      perform, using a neural network model, an analysis of at least one RCS message transmitted between the wireless device and a network node,
         wherein the neural network model is located locally on the wireless device;
      generate, using the neural network model, a recommendation for a request for an RCS poll based on the analysis of the at least one RCS message;
      transmit, using a message session relay protocol (MSRP), the request to the network node of a telecommunication network,
         wherein the request indicates a content type of RCS poll on the telecommunication network,
         wherein the request includes poll text and a poll type, and
         wherein the request for the RCS poll causes a display of the RCS poll via a messaging interface native to an operating system of the wireless device; and
      receive, using the MSRP, from the network node, a poll response,
         wherein the poll response causes a display of the poll response via the messaging interface native to the operating system of the wireless device.

2. The wireless device of claim 1, wherein the instructions further cause the wireless device to:
   generate the request in an extensible markup language (XML) format,
      wherein the poll text includes a question and at least two responses, and
      wherein the poll type includes a single-choice response or a multi-choice response poll.

3. The wireless device of claim 1, wherein the instructions further cause the wireless device to:
   receive multiple poll responses from multiple secondary RCS-enabled wireless devices via the network node;
   generate a poll graphic,
      wherein the poll graphic is a visual representation of the multiple poll responses; and
   cause the display of the poll graphic via the messaging interface native to the operating system of the wireless device.

4. The wireless device of claim 1, wherein the instructions further cause the wireless device to:
   encrypt the request for the RCS poll;
   transmit the encrypted request for the RCS poll to the network node;
   receive from the network node an encrypted poll response; and
   decrypt the encrypted poll response.

5. The wireless device of claim 1, wherein the instructions further cause the wireless device to:
   perform, using the neural network model, an analysis of multiple RCS messages transmitted between the wireless device and the network node;
   calculate a sentiment value based on the analysis of the multiple RCS messages; and
   generate, using the neural network model, the request for the RCS poll when the sentiment value exceeds a threshold value,
      wherein the neural network model is configured to generate the poll text based on the analysis of the multiple RCS messages.

6. The wireless device of claim 1, wherein the instructions further cause the wireless device to:
   generate, using the neural network model, a first request for an RCS poll,
      wherein the neural network model is configured to generate the poll text for the first request based on an input received to the wireless device; and
   generate, using the neural network model, multiple secondary requests for RCS polls in response to the first request,
      wherein each of the multiple secondary requests for RCS polls includes unique poll text, and
      wherein the neural network model is configured to generate the poll text of the multiple secondary requests for RCS polls based on the poll text of the first request for an RCS poll.

7. The wireless device of claim 1, wherein the instructions further cause the wireless device to:
   generate, via the messaging interface native to the operating system of the wireless device, a real-time graphic based on multiple poll responses received from the network node;
   perform, using the neural network model, an analysis of the multiple poll responses from multiple wireless devices;
   generate, using the neural network model, an insight about at least one RCS poll responder,
      wherein the neural network model is configured to generate the insight based on the analysis of the multiple poll responses,
      wherein the at least one RCS poll responder provided at least one poll response, and
      wherein the insight includes a predicted decision of the at least one RCS poll responder or a preference of the at least one RCS poll responder;
   update the real-time graphic based on the insight; and
   cause the display of the updated real-time graphic via the messaging interface native to the operating system of the multiple wireless devices.

8. The wireless device of claim 1, wherein the instructions further cause the wireless device to:
   receive a post on the messaging interface native to the operating system of the wireless device,
      wherein the post comprises a video or an image;
   transmit the post having the request for the RCS poll embedded therein to the network node; and
   cause the wireless device to display an embedded RCS poll on a story post for a predetermined time period.

9. A non-transitory, computer-readable storage medium comprising instructions recorded thereon, wherein the instructions, when executed by at least one data processor of a system, cause the system to:

perform, using a neural network model, an analysis of at least one RCS message transmitted between a rich communication services (RCS)-enabled wireless device and a network node of a telecommunication network,
  wherein the neural network model is located on the network node;
generate, using the neural network model, a recommendation for a request for an RCS poll based on the analysis of the at least one RCS message;
receive, at the network node of the telecommunication network, using a message session relay protocol (MSRP), the request from the RCS-enabled wireless device,
  wherein the request indicates a content type of an RCS poll on the telecommunication network,
  wherein the request includes poll text and a poll type, and
  wherein the request for the RCS poll causes a display of the RCS poll via a messaging interface native to an operating system of the RCS-enabled wireless device; and
transmit, using the MSRP, a poll response to the RCS-enabled wireless device,
  wherein the poll response causes a display of the poll response via the messaging interface native to the operating system of the RCS-enabled wireless device.

10. The non-transitory, computer-readable storage medium of claim 9, wherein the instructions further cause the system to:
generate the request in an extensible markup language (XML) format,
  wherein the poll text includes a question and at least two responses, and
  wherein the poll type includes a single-choice response or a multi-choice response poll.

11. The non-transitory, computer-readable storage medium of claim 9, wherein the instructions further cause the system to:
generate, using the neural network model, a first request for an RCS poll,
  wherein the neural network model is configured to generate the poll text for the first request based on an input received from the RCS-enabled wireless device; and
generate, using the neural network model, multiple secondary requests for RCS polls,
  wherein each of the multiple secondary requests for RCS polls includes unique poll text, and
  wherein the neural network model is configured to generate the poll text of the multiple secondary requests for RCS polls based on the poll text of the first request for an RCS poll.

12. A method comprising:
performing, using a neural network model, an analysis of at least one RCS message transmitted between a rich communication services (RCS)-enabled wireless device and a network node of a telecommunication network,
  wherein the neural network model is located on a secondary network node;
generating, using the neural network model, a recommendation for a request for an RCS poll based on the analysis of the at least one RCS message;
receiving, at the network node of the telecommunication network, using a message session relay protocol (MSRP), the request from the RCS-enabled wireless device,
  wherein the request indicates a content type of an RCS poll on the telecommunication network,
  wherein the request includes poll text and a poll type, and
  wherein the request for the RCS poll causes a display of the RCS poll via a messaging interface native to an operating system of the RCS-enabled wireless device; and
transmitting, using the MSRP, a poll response to the RCS-enabled wireless device,
  wherein the poll response causes a display of the poll response via the messaging interface native to the operating system of the RCS-enabled wireless device.

13. The method of claim 12, further comprising:
generating the request in an extensible markup language (XML) format,
  wherein the poll text includes a question and at least two responses, and
  wherein the poll type includes a single-choice response or a multi-choice response poll.

14. The method of claim 12, further comprising:
causing the secondary network node to perform, using the neural network model, an analysis of multiple RCS messages transmitted between the RCS-enabled wireless device and the network node,
  wherein the neural network model calculates a sentiment value based on the analysis of the multiple RCS messages, and
  wherein the neural network model generates the request for the RCS poll when the sentiment value exceeds a threshold value.

15. The method of claim 12, wherein the poll type is a dashboard poll, further comprising:
generating, via the messaging interface native to the operating system of the RCS-enabled wireless device, a real-time graphic based on multiple poll responses received from the network node;
causing the secondary network node to perform, using the neural network model, an analysis of the multiple poll responses from multiple RCS-enabled wireless devices;
causing the secondary network node to generate, using the neural network model, an insight about at least one RCS poll responder,
  wherein the neural network model is configured to generate the insight based on the analysis of the multiple poll responses,
  wherein the at least one RCS poll responder provided at least one poll response, and
  wherein the insight includes a predicted decision of the at least one RCS poll responder or a preference of the at least one RCS poll responder; and
updating the real-time graphic based on the insight received from the secondary network node,
  wherein the updated real-time graphic causes the RCS-enabled wireless device to display the updated real-time graphic via the messaging interface native to the operating system of the multiple RCS-enabled wireless devices.

16. The non-transitory, computer-readable storage medium of claim 9, wherein the instructions further cause the system to:

generate a poll graphic based on multiple poll responses from multiple secondary RCS-enabled wireless devices,
    wherein the poll graphic is a visual representation of the multiple poll responses; and
cause the display of the poll graphic via the messaging interface native to the operating system of the wireless device.

17. The non-transitory, computer-readable storage medium of claim 9, wherein the instructions further cause the system to:
perform, using the neural network model, an analysis of multiple RCS messages transmitted between the RCS-enabled wireless device and the network node,
    wherein the neural network model calculates a sentiment value based on the analysis of the multiple RCS messages, and
    wherein the neural network model generates the request for the RCS poll when the sentiment value exceeds a threshold value.

18. The non-transitory, computer-readable storage medium of claim 9, wherein the instructions further cause the system to:
generate, via the messaging interface native to the operating system of the RCS-enabled wireless device, a real-time graphic based on multiple poll responses received from the network node;
perform, using the neural network model, an analysis of the multiple poll responses from multiple RCS-enabled wireless devices;
generate, using the neural network model, an insight about at least one RCS poll responder,
    wherein the neural network model is configured to generate the insight based on the analysis of the multiple poll responses,
    wherein the at least one RCS poll responder provided at least one poll response, and
    wherein the insight includes a predicted decision of the at least one RCS poll responder or a preference of the at least one RCS poll responder; and
updating the real-time graphic based on the insight,
    wherein the updated real-time graphic causes the RCS-enabled wireless device to display the updated real-time graphic via the messaging interface native to the operating system of the multiple RCS-enabled wireless devices.

19. The method of claim 12, further comprising:
generating a poll graphic based on multiple poll responses from multiple secondary RCS-enabled wireless devices,
    wherein the poll graphic is a visual representation of the multiple poll responses; and
causing the display of the poll graphic via the messaging interface native to the operating system of the wireless device.

20. The method of claim 12, further comprising:
causing the secondary network node to generate, using the neural network model, a first request for an RCS poll,
    wherein the neural network model is configured to generate the poll text for the first request based on an input received to the wireless device; and
causing the secondary network node to generate, using the neural network model, multiple secondary requests for RCS polls in response to the first request,
    wherein each of the multiple secondary requests for RCS polls includes unique poll text, and
    wherein the neural network model is configured to generate the poll text of the multiple secondary requests for RCS polls based on the poll text of the first request for an RCS poll.

* * * * *